(12) United States Patent
Hung

(10) Patent No.: US 11,212,968 B2
(45) Date of Patent: Jan. 4, 2022

(54) METHOD, SYSTEM FOR REMOTELY GROWING PLANTS, COMPUTER PROGRAM PRODUCT FOR IMPLEMENTING THE METHOD, AND FARMING TOOL ASSEMBLY

(71) Applicant: Chin-Min Hung, New Taipei (TW)

(72) Inventor: Chin-Min Hung, New Taipei (TW)

( * ) Notice: Subject to any disclaimer, the term of this patent is extended or adjusted under 35 U.S.C. 154(b) by 407 days.

(21) Appl. No.: 16/277,206

(22) Filed: Feb. 15, 2019

(65) Prior Publication Data
US 2020/0221649 A1    Jul. 16, 2020

(30) Foreign Application Priority Data

Jan. 11, 2019 (CN) .......................... 201910025504.1

(51) Int. Cl.
| B25J 9/16 | (2006.01) |
| A01G 9/029 | (2018.01) |
| B25J 13/00 | (2006.01) |
| A01C 14/00 | (2006.01) |

(52) U.S. Cl.
CPC ............ *A01G 9/0299* (2018.02); *A01C 14/00* (2013.01); *A01G 9/0297* (2018.02); *B25J 9/1697* (2013.01); *B25J 13/006* (2013.01)

(58) Field of Classification Search
USPC ................................................ 700/245–264
See application file for complete search history.

(56) References Cited

U.S. PATENT DOCUMENTS

| 6,243,987 B1* | 6/2001 | Hessel ................. | A01B 79/005 47/65.5 |
| 6,336,051 B1* | 1/2002 | Pangels ................ | A01B 79/005 700/207 |
| 6,671,582 B1* | 12/2003 | Hanley .................... | B25J 5/007 700/245 |
| 7,765,780 B2* | 8/2010 | Koselka ................ | A01D 46/30 56/10.2 A |
| 9,457,473 B2* | 10/2016 | Rudakevych ............ | B25J 9/104 |
| 9,532,508 B1* | 1/2017 | Stubbs ................... | A01D 91/04 |
| 9,913,429 B1* | 3/2018 | Stubbs ................... | B25J 9/1697 |
| 10,462,972 B2* | 11/2019 | Moore ..................... | A01G 3/085 |
| 2002/0088173 A1* | 7/2002 | Hessel ................... | A01C 11/02 47/60 |
| 2007/0013510 A1* | 1/2007 | Yamada .................. | G01S 13/74 340/539.1 |
| 2010/0268679 A1* | 10/2010 | Anderson ................ | G06N 5/02 706/46 |
| 2011/0137456 A1* | 6/2011 | Koselka ................. | A01D 46/30 700/245 |
| 2013/0345876 A1* | 12/2013 | Rudakevych ............ | B25J 9/104 700/259 |
| 2014/0196366 A1* | 7/2014 | Teasdale ............. | A01G 9/0299 47/66.7 |

(Continued)

*Primary Examiner* — Jonathan L Sample
(74) *Attorney, Agent, or Firm* — Burris Law, PLLC

(57) ABSTRACT

A method is proposed for remotely growing plants in a planting zone that is divided into multiple planting areas. Via an electronic device that communicates with a remote automated planting sub-system in the planting zone, a user may select desired planting area(s) and desired type(s) of plant precursors on the electronic device, and remotely cause the remote automated planting sub-system to plant the selected type(s) of plant precursors into the selected planting area(s).

19 Claims, 9 Drawing Sheets

(56) References Cited

U.S. PATENT DOCUMENTS

| | | | |
|---|---|---|---|
| 2015/0351326 A1* | 12/2015 | D'Aoust | A01G 7/00 47/1.5 |
| 2016/0144408 A1* | 5/2016 | Struijk | B25J 11/00 209/580 |
| 2016/0243696 A1* | 8/2016 | Kahani | B25J 9/1612 |
| 2017/0027110 A1* | 2/2017 | Ito | A01G 9/249 |
| 2017/0227969 A1* | 8/2017 | Murray | B60K 6/20 |
| 2017/0318753 A1* | 11/2017 | Teasdale | A01G 9/0297 |
| 2018/0007842 A1* | 1/2018 | Van Der El | B25J 9/1697 |
| 2018/0017965 A1* | 1/2018 | Kosa | A01D 46/30 |
| 2018/0335372 A1* | 11/2018 | Orol | A01G 3/00 |
| 2018/0373937 A1* | 12/2018 | Shulman | G06K 9/00671 |
| 2019/0000019 A1* | 1/2019 | Alexander | A01G 9/02 |
| 2019/0021238 A1* | 1/2019 | Alexander | B25J 19/023 |
| 2019/0261565 A1* | 8/2019 | Robertson | A01D 46/243 |
| 2020/0037522 A1* | 2/2020 | DeJarnette | B25J 5/007 |
| 2020/0380438 A1* | 12/2020 | Briggs | A01G 7/045 |

\* cited by examiner

METHOD, SYSTEM FOR REMOTELY GROWING PLANTS, COMPUTER PROGRAM PRODUCT FOR IMPLEMENTING THE METHOD, AND FARMING TOOL ASSEMBLY

CROSS-REFERENCE TO RELATED APPLICATION

This application claims priority of Chinese Invention Patent Application No. 201910025504.1, filed on Jan. 11, 2019.

FIELD

The disclosure relates to a method of growing plants, and more particularly to a method for remotely growing plants.

BACKGROUND

In recent years, many countries promote organic agriculture for the purposes of water and soil conservation, biodiversity conservation and food safety. However, the promotion of organic agriculture is obstructed for reasons which may decrease consumers' faith in relevant products and worry participating farmers and growers, such as: 1) even if buffer zones are in place, an organic farmland is still easily contaminated by neighboring farmlands; 2) organic fertilizers are expensive; and 3) related laws and regulations are inadequate. In addition, since the processes of planting precursors into a farmland and harvesting may need more manpower than taking care of the crops, the inconsistent requirements of manpower may be negatively impact the general public's desire to take part in organic agriculture.

SUMMARY

Therefore, an object of the disclosure is to provide a method that can facilitate people to grow plants or crops, in order to motivate more people to participate in organic agriculture.

According to the disclosure, the method is provided for remotely growing plants in a planting zone that is divided into a plurality of planting areas. The method includes: by a user end electronic device, displaying an image that is related to the planting zone, and that contains a plurality of planting units, each of the planting units corresponding to one of the planting areas; by the user end electronic device, displaying a plurality of plant precursor options after M number of the planting unit(s) is(are) selected by a user operating the user end electronic device, where M is a positive integer; by the user end electronic device, transmitting planting information to a remote automated planting sub-system that is disposed in the planting zone and that is communicatively coupled to the user end electronic device after N number of the plant precursor option(s) is (are) selected by the user, where N is a positive integer, the planting information containing the M number of the planting unit(s) and the N number of the plant precursor option(s) that were selected by the user; and upon receipt of the planting information, by the remote automated planting sub-system, acquiring plant precursors of N type(s) that correspond(s) to the N number of the plant precursor option (s), and planting the plant precursors thus acquired in M number of the planting areas that correspond(s) to the M number of the planting unit(s).

Another object of the disclosure is to provide a system for remotely growing plants in a planting field that is divided into a plurality of planting areas. The system includes the abovementioned user end electronic device and remote automated planting sub-system that communicate with each other to perform the method of this disclosure.

Another object of the disclosure is to provide a computer program product including a computer-readable storage medium which is non-transitory and tangible. The computer-readable storage medium stores an application program which, when loaded and executed by a computer device, causes the computer device to communicate with a remote automated planting sub-system that is disposed in a planting field to perform the method of this disclosure.

Another object of the disclosure is to provide a farming tool assembly suitable for use in the method of this disclosure. The farming tool assembly includes a base structure, a plurality of nursery components, a plurality of cutting component, and a linking device. The base structure is formed with a plurality of first openings, and is formed with a plurality of first engaging portions respectively proximate to the first openings. Each of the nursery components is removably mounted to the base structure, and is formed with a second engaging portion on the top of the nursery component. When one of the nursery components is placed into one of the first openings of the base structure, the second engaging portion is capable of engaging with the first engaging portion that is proximate to the one of the first openings, so that the one of the nursery components is secured to the base structure. The cutting components are disposed on top of the base structure and are respectively proximate to the first openings. The linking device is connected to the cutting components, and is operable to make the cutting components slide over the first openings.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
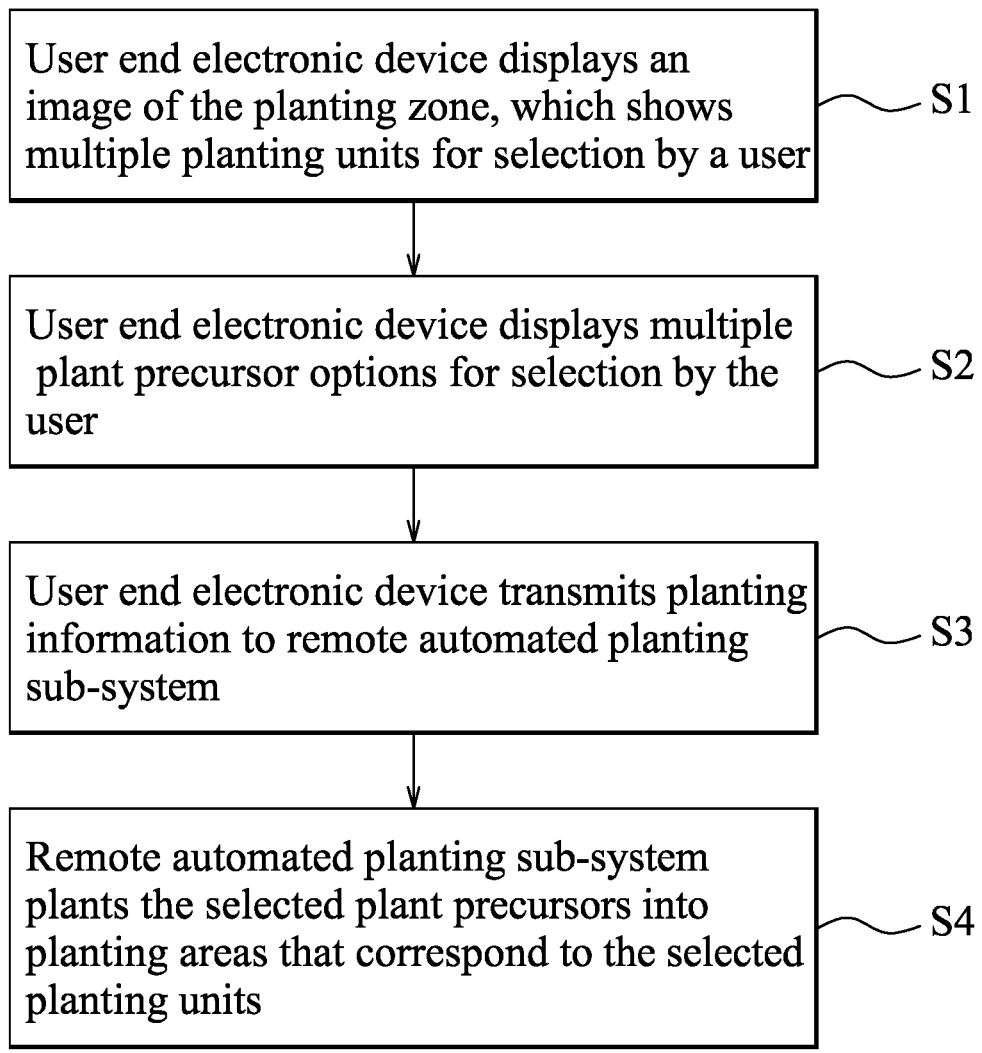
FIG. 1 is a flow chart illustrating steps of an embodiment of the method for remotely growing plants in a planting zone according to this disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
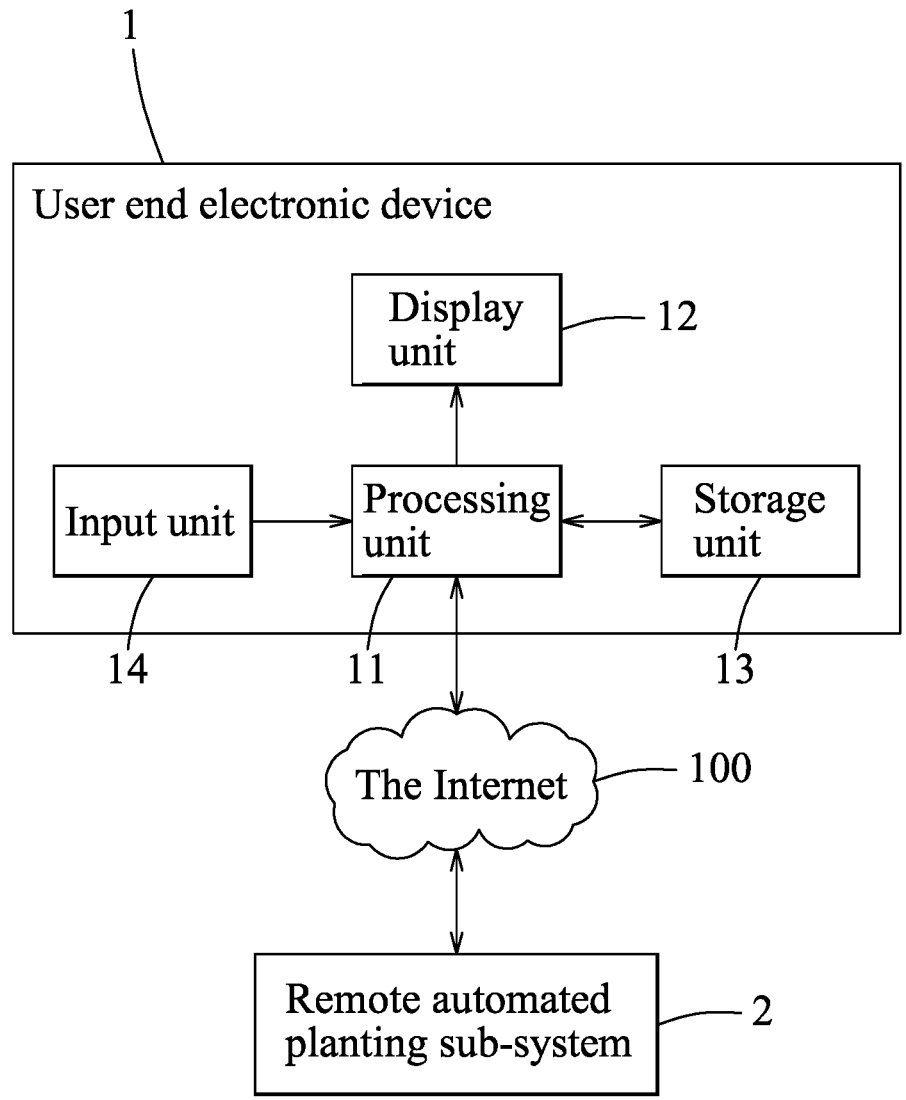
FIG. 2 is a block diagram illustrating a system to implement the embodiment and showing an exemplary structure of a user end electronic device of the system.
Figure 5:
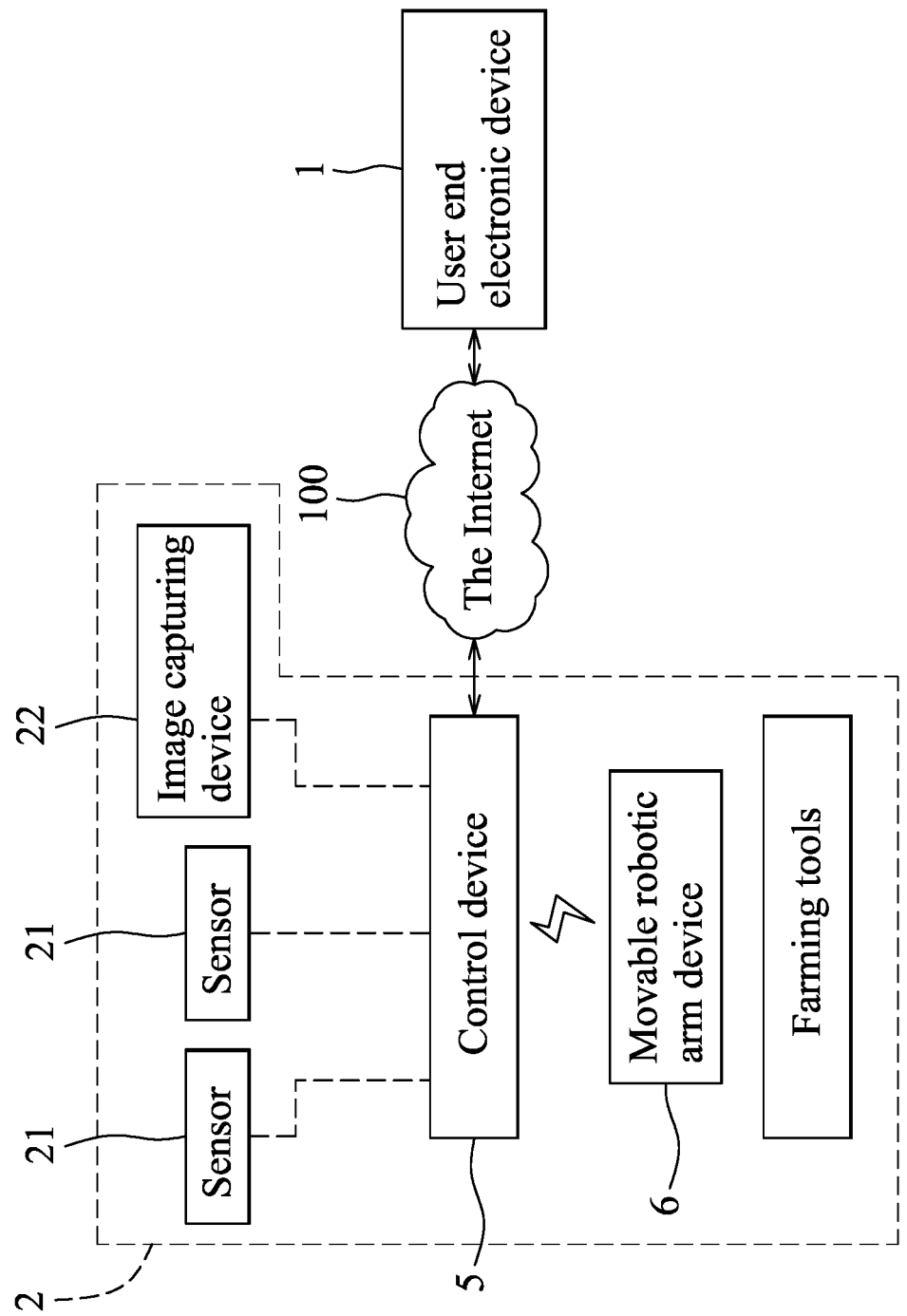
FIG. 5 is a block diagram illustrating the system with an exemplary structure of a remote automated planting sub-system of the system.

Referring to FIG. 1, the embodiment of the method for remotely growing plants in a planting zone according to this disclosure is implemented by a system as shown in FIG. 2. In FIG. 2, the system includes a user end electronic device 1 and a remote automated planting sub-system 2 that communicate with each other via a network, such as the Internet 100. The user end electronic device 1 may be, but not limited to, a mobile phone, a tablet computer, a notebook computer, a desktop computer, or the like, and includes a processing unit 11, a display unit 12, a storage unit 13, and an input unit 14 (e.g., a keyboard, a computer mouse, or any other device/technologies capable of inputting information into a computer), where the display unit 12, the storage unit 13 and the input unit 14 are electrically coupled to the processing unit 11. The storage unit 13 may be a computer readable storage medium which is non-transitory and tangible, such as an optical disc, a hard disk drive, a solid state drive, etc. The storage unit 13 stores an application program which, when loaded and executed by the processing unit 11 of the user end electronic device 1, causes the user end electronic device 1 to perform the embodiment of the method. The remote automated planting sub-system 2 is disposed at the planting zone, such as a farm, a farmland, a hydroponic system, which may be indoor or outdoor, and the planting zone is divided into a plurality of planting areas. Each of the planting areas is provided with a planting medium, such as soil, culture solution for hydroponic farming, etc. Referring to FIG. 5, the remote automated planting sub-system 2 includes a control device 5 (e.g., a personal computer, or a computerized device having similar functions), a sensor unit that may include a plurality of sensors 21, and an image capturing device 22 that cooperates with the sensor unit to detect environment conditions of the planting areas. The sensors 21 may include, but not limited to, thermometers, hygrometers, pyranometers, electrical conductivity (EC) meters for detecting pH level of the planting medium (e.g., soil pH), etc. The image capturing device 22 may be, for example, a video recorder that periodically captures images of the planting areas.

Figure 3:
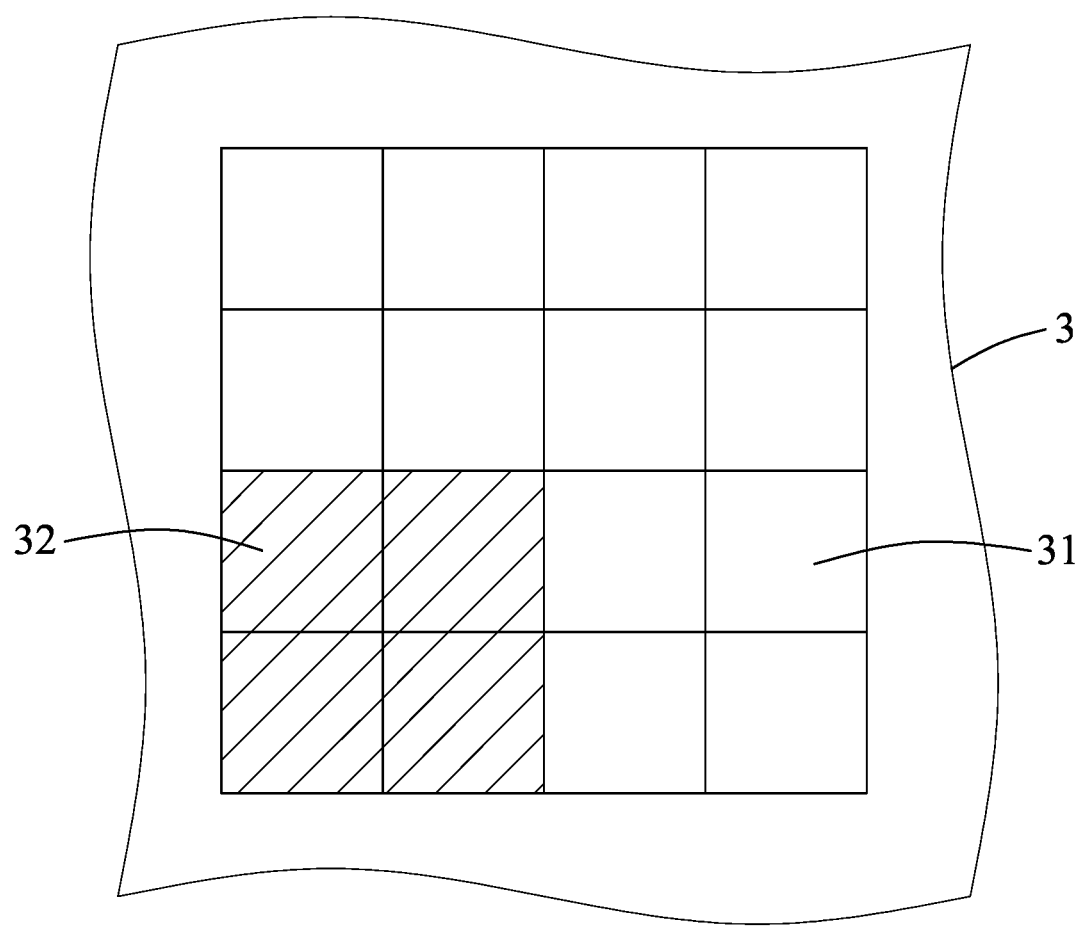
FIG. 3 is a schematic diagram showing an exemplary image that is displayed by the user end electronic device and that contains multiple planting units.

When a user intends to grow plants in the planting zone but is unable to be there in person, the user may operate the input unit 14 to make the processing unit open/execute the application program that is pre-stored/installed in the storage unit 13 to connect the user end device 1 to the remote automated planting sub-system 2, and to cause the display unit 12 to display an image of the planting zone (step S1), which may be captured by the image capturing device 22 in real time or in advance. In FIG. 3, the image 3 displayed by the display unit 12 in step S1 shows a plurality of planting units 31 for selection by the user, where each of the planting units 31 corresponds to one of the planting areas. When one or more planting units 31 have been selected, the planting unit(s) 31 would be prohibited from being selected again, and would be marked using a different color (different from the remaining, unselected planting unit(s) 31) or a symbol, as denoted by the reference numeral 32 in FIG. 3.

Figure 4:
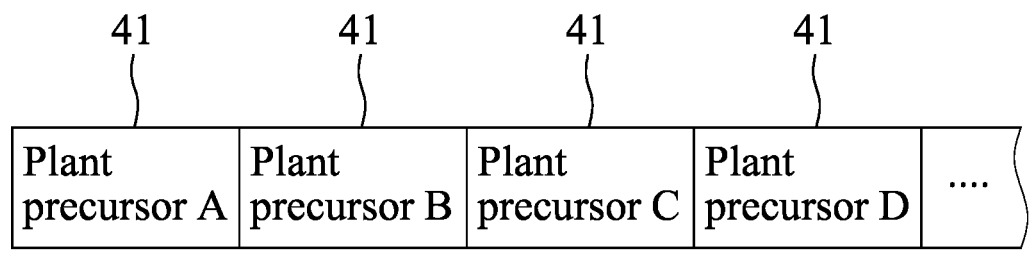
FIG. 4 is a schematic diagram exemplarily showing a plurality of plant precursor options displayed on the user end electronic device.

In step S2, after the user operates the input unit 14 to select M number (M is a positive integer) of the planting unit(s) 31 and transmit a confirming instruction to the processing unit 11, the processing unit 11 causes the display unit 12 to display, as shown in FIG. 4, a plurality of plant precursor options 41 that respectively correspond to "Plant seedling A", "Plant seedling B" . . . and so on, for being selected by the user. It is noted that the term "plant precursor" may refer to, for example, seeds or seedlings of a plant. When a plant precursor option 41 is selected, the processing unit 11 may cause the display unit 12 to show information relevant to the plant corresponding to the selected plant precursor option, such as images, videos, characteristics, expected growth period, care instructions of the plant, and so on. After understanding the relevant information of the plants, the user may decide how many kinds of plant precursor options to select. This decision can be made partly based on the number of the planting unit(s) 31 selected by the user. In this embodiment, one planting area can only correspond to and be planted with one kind of plant seeds or seedlings. In other embodiments, one planting area may correspond to and be planted with multiple kinds of plant seeds and/or seedlings, and this disclosure is not limited in this respect.

In step S3, after the user operates the input unit 14 to select N number (N is a positive integer) of the plant precursor option(s) 41 and transmit a confirming instruction to the processing unit 11, the user end electronic device 1 transmits, to the remote automated planting sub-system 2, planting information that contains the M number of the planting unit(s) 31 and the N number of the plant precursor option(s) 41 that were selected by the user.

In step S4, upon receipt of the planting information, the remote automate planting system 2 acquires, according to the planting information, plant precursors (e.g., seeds/seedlings) of N type(s) that correspond(s) to the N number of the selected plant precursor option(s), and plants the acquired plant precursors in M number of the planting areas that correspond(s) to the M number of the selected planting unit(s) 31. In this embodiment, the planting of the plant precursors in the M number of planting areas is performed while ensuring that any one planting area only has one type of plant precursors planted therein. For example, if the user selects two planting units 31 and two plant precursor options 41, two types (kinds) of plant precursors (e.g., two types of vegetable seedlings) that correspond to the selected two plant precursor options 41 would be planted into two planting areas that correspond to the selected two planting units 31.

Figure 7:
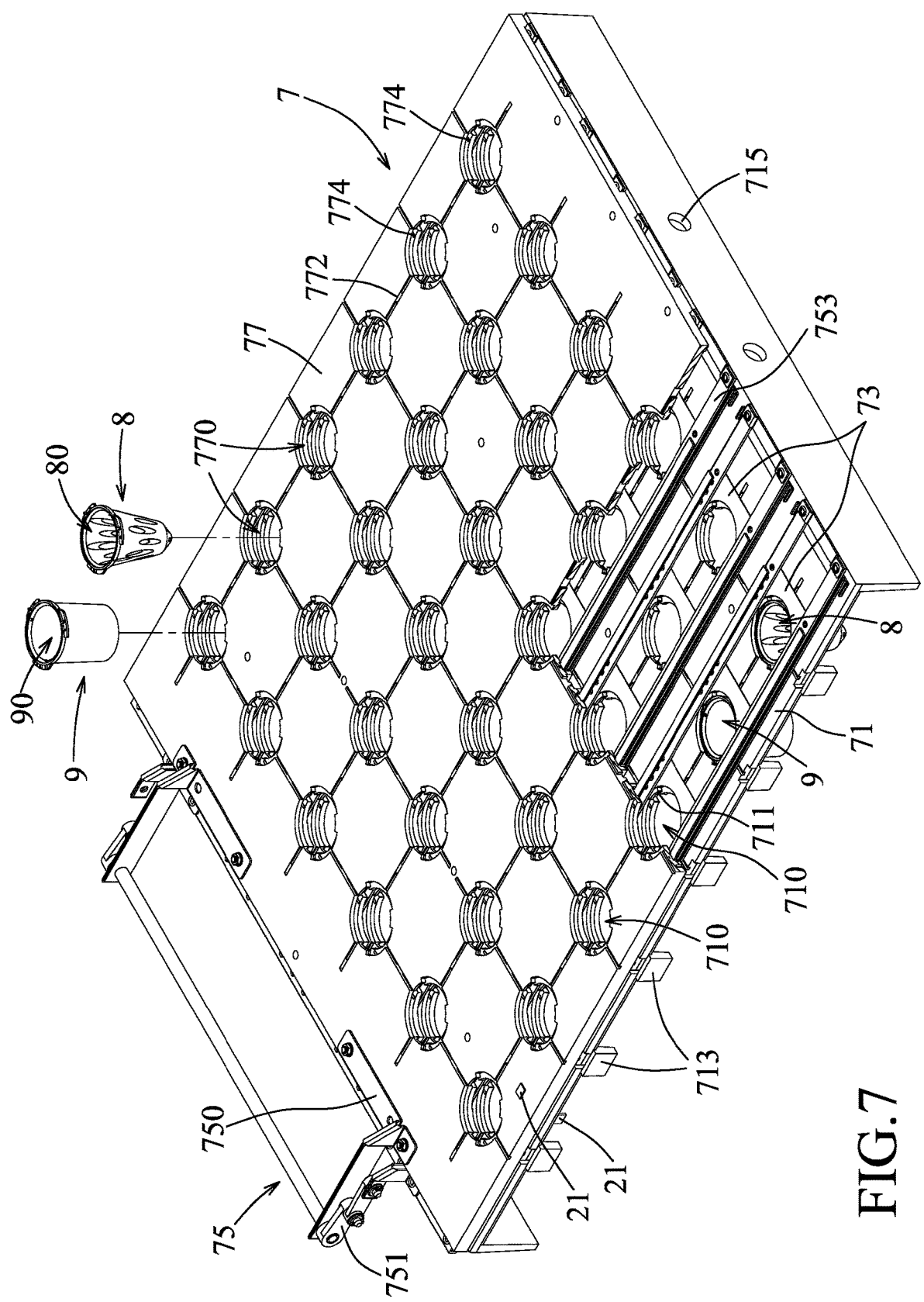
FIG. 7 is a perspective view of farming tools of the system.
Figure 8:
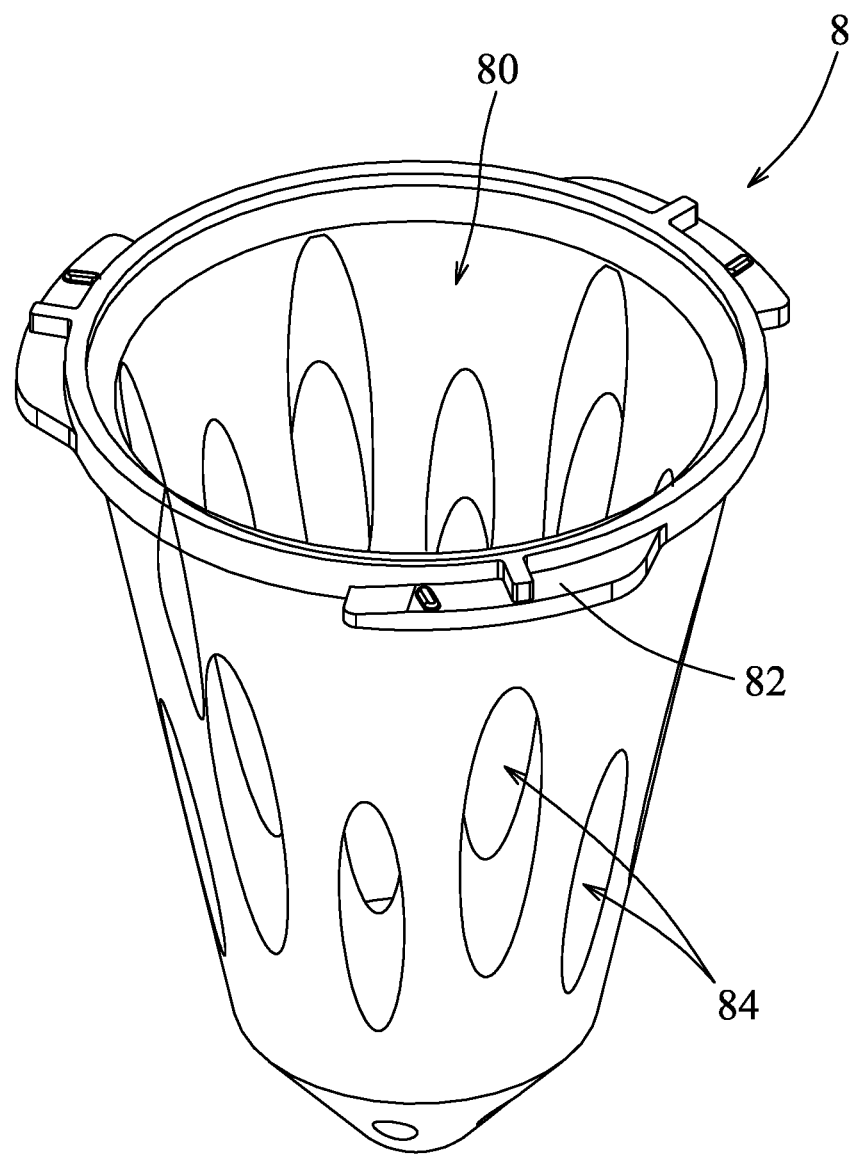
FIG. 8 is a perspective view of a nursery component of the farming tools.

Referring to FIG. 5 and FIG. 7, the remote automated planting sub-system 2 further includes a movable robotic arm device 6 and various kinds of farming tools. The farming tools include base structures 71 (only one is depicted) and nursery components 8 (only one is depicted), each of which can be removably mounted to one of the base structures 71. Each of the base structures 71 may be assembled with multiple nursery components 8 to form a farming tool assembly 7. Each farming tool assembly 7 is adapted for use in one planting area. As shown in FIG. 7, each base structure 71 is formed with a plurality of first openings 710, and is formed with a plurality of first engaging portions 711 respectively proximate to the first openings 710. Further referring to FIG. 8, each nursery component 8 is indented to form a recess 80 where a plant precursor can be accommodated, and is formed with a second engaging portion 82 on the top of the nursery component 8. When a nursery component 8 is placed into one of the first openings 710 of one of the base structures 71, the second engaging portion 81 is capable of engaging with the first engaging portion 711 that is proximate to said one of the first openings 710, so the nursery component 8 is secured to the base structure 71.

In step S4, the control device 5 controls, based on the planting information, the movable robotic arm device 6 to secure (obtain) those of the nursery components 8 that accommodate plant precursors of the selected N type(s) to M number of the base structures 71, so as to form M number of the farming tool assembly(ies) 7. In detail, assuming that M is greater than one, the control device 5 controls, according to the planting information, the movable robotic arm device 6 to secure multiple nursery components 8 that accommodate plant precursors of one of the selected N type(s) to an empty base structure 71, and controls the movable robotic arm device 6 to secure multiple nursery components 8 that accommodate plant precursors of one of the selected N type(s) to another empty base structure 71, and so on, until M number of the base structures 71 are secured with nursery components 8 accommodating plant precursors of the selected N type (s) (i.e., until M number of farming tool assemblies 7 that, collectively, contain the desired type(s) of plant precursors are formed). Then, the control device 5 controls the movable robotic arm device 6 to place the M number of farming tool assembly(ies) 7 onto the M number of the planting area(s), respectively, such that the nursery components 8 of each of the M number of farming tool assembly(ies) 7 have their bottoms extending into the planting medium in the respective one of the planting areas. It is noted that the nursery components 8 are made to be rigid enough to break through a surface of the planting medium, so in the case that the plant precursors in the nursery components 8 are seedlings, the roots of the seedlings can remain intact. In addition, each nursery component 8 has a side wall formed with a plurality of through holes 84 in spatial communication with the recess 80, so that the roots of plant seedlings or grown plants can extend out of the nursery components 8 via the through holes 84.

To favor plant growth, a proper number of the nursery components 8 to be placed in one base structure 7 and a proper distance between adjacent nursery components 8 depend on the type of the plant. Accordingly, the base structures 7 may be designed to fit the size of the planting areas and to have the size, number, and shape of the first openings 71 and the distance between adjacent first openings 71 meet the requirements for growing certain plants. Water that falls on the base structures 71 will flow into the nursery components 8 through the first openings 110, and will not drop directly onto the planting medium in the planting areas, so the planting medium, such as soil, will not be splashed onto the plants or plant seedlings, thereby reducing the risks of the plants or plant seedlings being polluted by bacteria in the soil, such as *E. coli*.

After step S4, the remote automated planting sub-system 2 may regularly transmit growth information of the plant precursors that have been planted in the planting areas to the user end electronic device 1. In detail, the control device 5 may regularly collect sensing results from the sensors 21, regularly obtain the images of the planting areas from the image capturing device 22, and generate and transmit the growth information of the plant precursors to the user end electronic device 1 based on the sensing results and the images.

Figure 6:
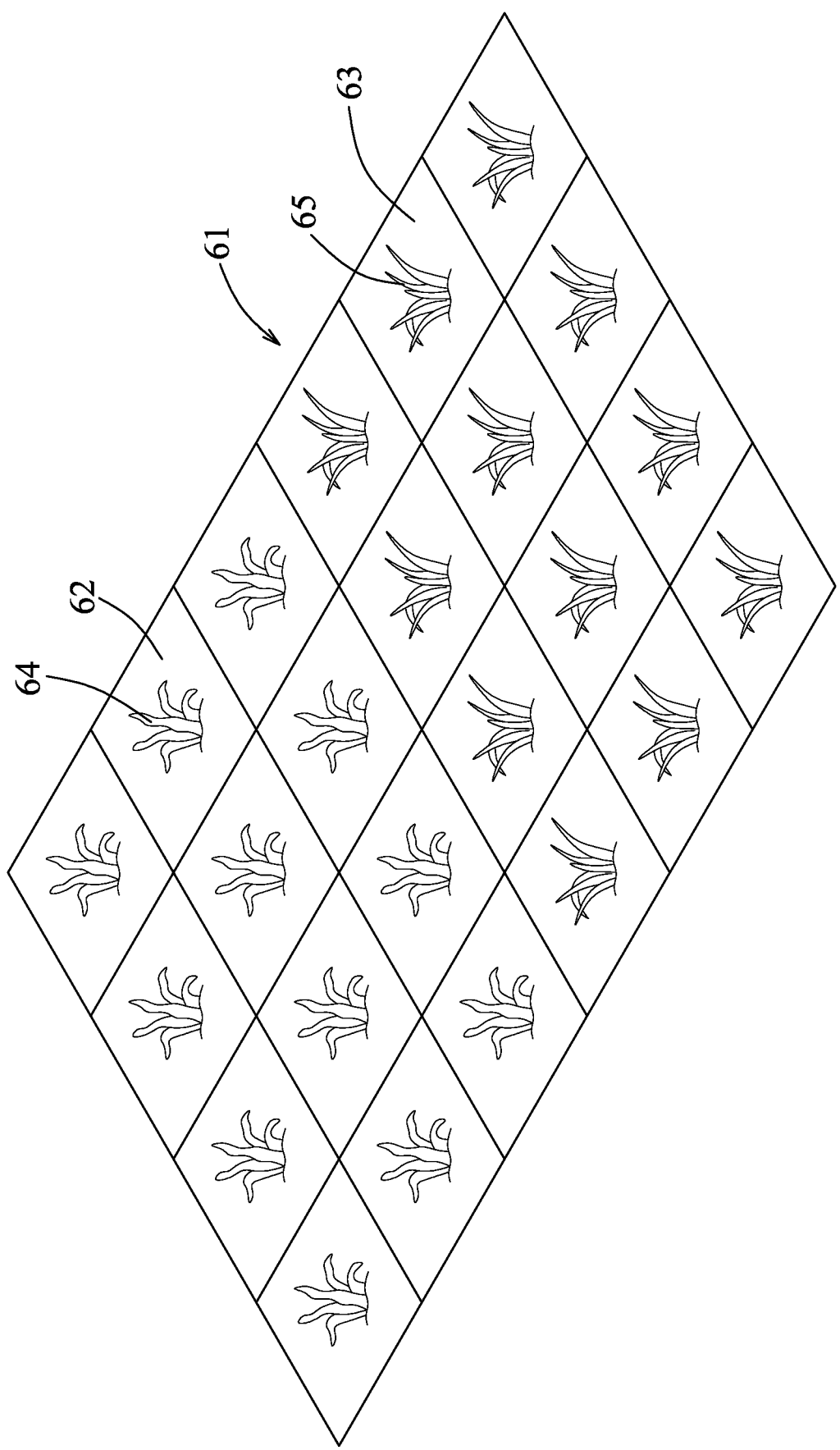
FIG. 6 is a schematic diagram illustrating a simulation image that is displayed by the user end electronic device and that shows growth conditions of the plants in the planting areas.

When desiring to know the growth conditions of the plant seeds or seedlings planted in the planting areas, the user may operate the user end electronic device 1 to open the application program, so that the processing unit 11 generates, as shown in FIG. 6, a simulation image 61 based on the growth information, and causes the display unit 12 to display the simulation image 61. The exemplary simulation image 61 of FIG. 6 simulates growth conditions of two types of plants or plant precursors (see virtual images 64, 65) in two planting areas (see virtual images 62, 63). The virtual images 64, 65 of the plants in the virtual images 62, 63 of the planting areas may change in correspondence to the actual growth conditions of the plants. For example, the plants may change in height and/or size (e.g., becoming taller and/or bigger), or change appearance because of sufficiency of water, nutrients, sunshine (e.g., being green when water, nutrients and insolation (solar radiation) are sufficient, and becoming yellow or withered when water, nutrients and/or insolation are insufficient). Accordingly, the user may track the growth conditions of the plants via the simulation images every day, every week, or at any time as desired. When the user wants to know the growth of the plants in more detail, the user may click on a desired one of the virtual images 62, 63 of the planting areas in the simulation image 61, so that the processing unit 11 causes the display unit 12 to display, based on the growth information, detailed information of the plants in the selected planting area. The detailed information may include daily images of the plants that were captured by the image capturing device 22, and variations in temperature, humidity, insolation, and/or pH level of the planting medium, which were obtained by the sensors 21.

Figure 9:
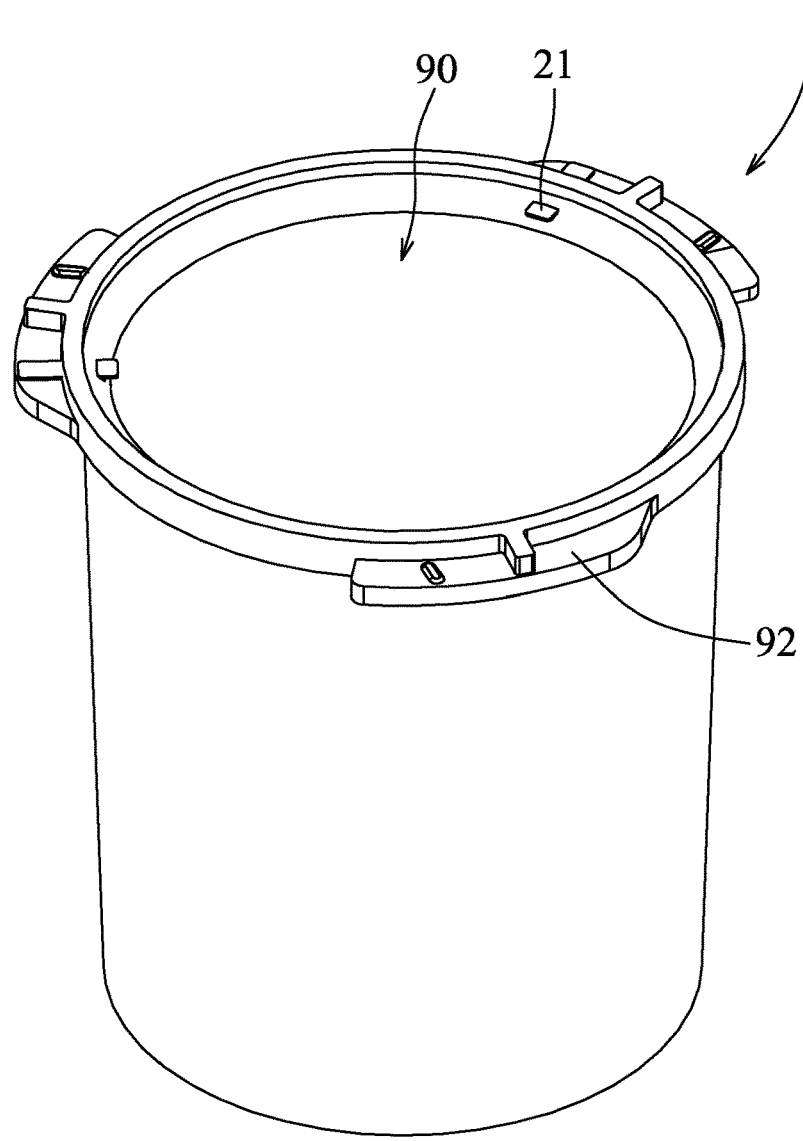
FIG. 9 is a perspective view of a functional component of the farming tools.

Further referring to FIG. 9, the farming tools may further include functional components 9 (only one is depicted) each being formed with a third engaging portion 92 on the top of the functional component 9. When the functional component 9 is placed into one of the first openings 710 of one of the base structures 71, the third engaging portion 92 of the functional component 9 is capable of engaging with one of the first engaging portions 711 that is proximate to said one of the first openings 710, so that the functional component 9 is secured to said one of the base structures 71. The functional components 9 may be configured but not limited to serve the functions of catching insects, deworming, attracting insect, watering, providing fertilizer or culture solution, etc. In some embodiments, the functional components 9 may be equipped with cameras and/or sensors to detect the conditions of the planting environment and/or the planting medium, etc. In this embodiment, each functional component 9 includes a housing which is indented to form a space 90 and which is formed with the third engaging portion 92, and components or devices which are accommodated in the space 90 and which are capable of performing the desired functions. In this embodiment, there are multiple types of functional components 9.

Figure 10:
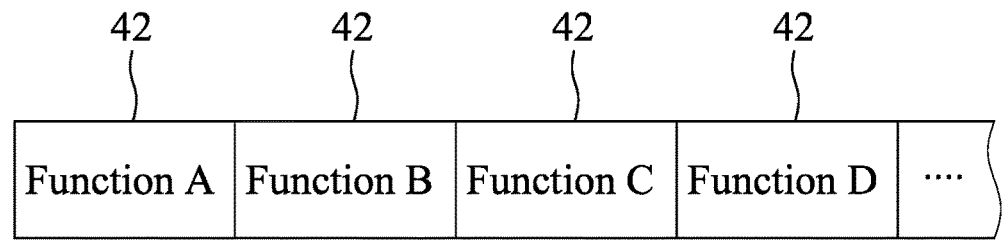
FIG. 10 is a schematic diagram exemplarily showing a function menu display by the user end electronic device.

After the remote automated planting sub-system 2 plants the plant precursors into the planting area(s) by placing the farming tool assembly(ies) 7 onto the planting area(s), as shown in FIG. 10, the processing unit 11 of the user end electronic device 1 may cause the display unit 12 to display a function menu containing a plurality of function options 42 corresponding to the different types of functional components 9. When the user operates the user end electronic device 1 to select at least one of the function options, the processing unit 11 transmits a function enabling instruction to the control device, where the function enabling instruction contains said at least one of the function options selected by the user. The control device 5 controls, based on the function enabling instruction, the movable robotic arm device 6 to acquire one or more functional components 9 of at least one type that corresponds to the at least one of the function options selected by the user (i.e., the functional component(s) 9 can perform the function(s) corresponding to the selected function option(s)), and secure the acquired functional component(s) 9 to one or more of the M number of the base structures 71 that are placed on the M number of the planting areas. The control device 5 may regularly control the functional component(s) 9 to perform the corresponding function(s), such as deworming, watering, image capturing, planting environment/medium detection, etc. The control device 5 may regularly collect the function execution result to enrich the growth information (to become part of the growth information), and timely transmit the growth information to the user end electronic device 1, so the user may view the latest growth condition of the plants or plant precursors at any time. It is noted herein each first opening 710 can receive only either a nursery component 8 or a functional component 9 at a time, and a farming tool assembly 7 may be composed by a base structure 71 assembled with all nursery components 8, assembled with a combination of nursery and functional components 8, 9, or assembled with functional components 9 only, based on user selection.

Figure 11:
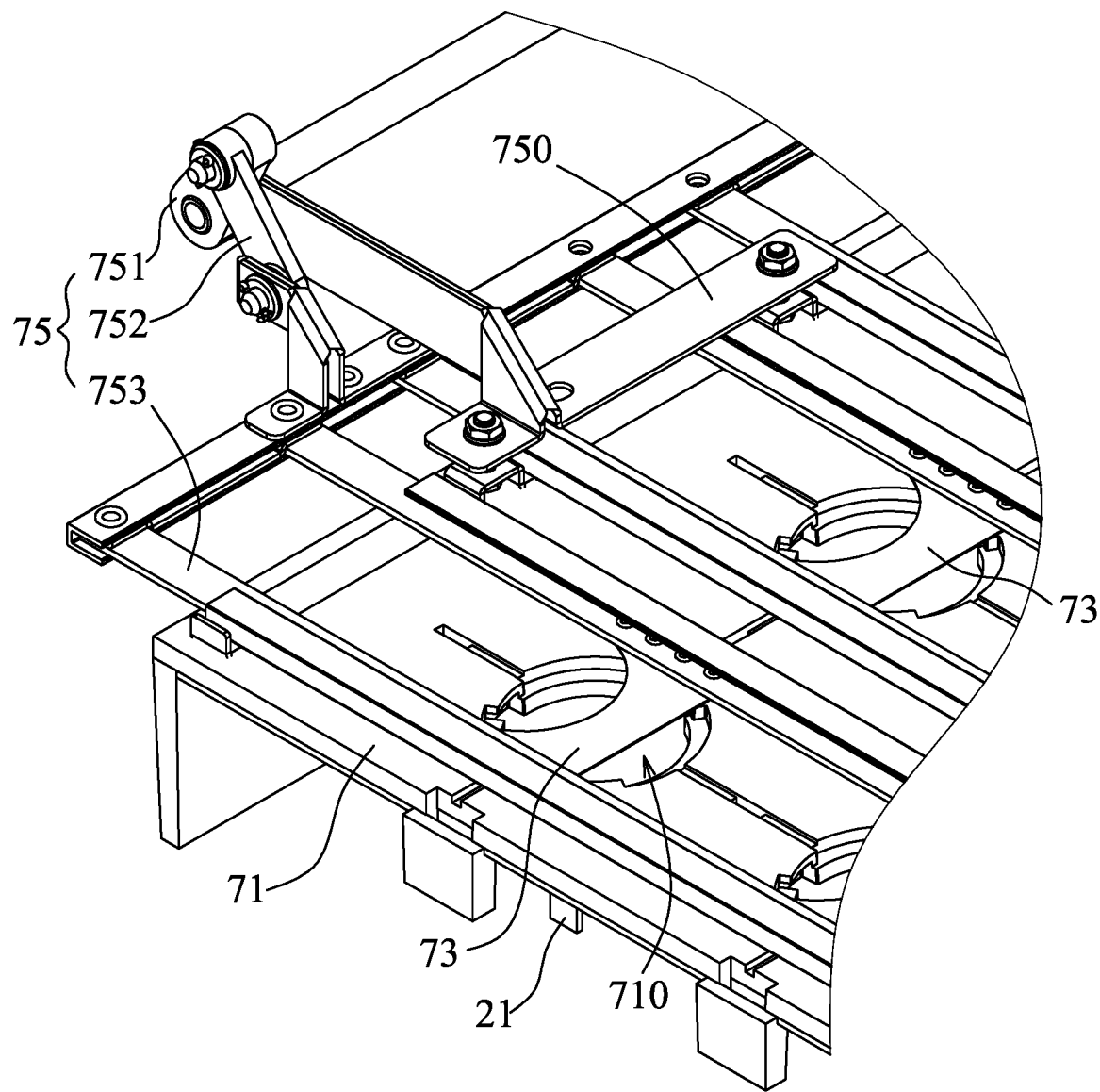
FIG. 11 is a fragmentary perspective view showing a linking device of the farming tools.

Referring to FIGS. 7 and 11, the farming tools may further include, for each of the base structures 71, a plurality of cutting components 73 and a linking device 75 connected to the cutting components 73. After assembling selected nursery and/or functional components 8, 9 onto a base structure 71, the cutting components 73 may be disposed on top of the base structure 71 to be respectively proximate to the first openings 710. The linking device 75 includes: a fastening member 750 having a first end portion fastened to the base structure 71, and a second end portion away from the first end portion thereof; a driving member 751 (e.g., a crankshaft) having a first end portion pivotally connected to the second end portion of the fastening member 750, and a second end portion away from the first end portion thereof; an intermediate member 752 having a first end portion pivotally connected to the second end portion of the driving member 751, and a second end portion away from the first end portion thereof; and a sliding member 753 connected to the second end portion of the intermediate member 752 and disposed on top of the base structure 71. The sliding member 753 is connected to the cutting components 73, and is slidable in a sliding direction parallel to a top surface of the base structure 71, such that, when the driving member 751 is operated to move the intermediate member 752 relative to the base structure 71, the intermediate member 752 moved by the driving member 751 causes the sliding member 753 to slide in the sliding direction, bringing the cutting components 73 to slide over the first openings 710. In this case, a single farming tool assembly 7 includes the base structure 71, selected nursery and/or functional components 8, 9, the cutting components 73 and the linking device 75.

When the plant precursors in the planting areas have grown up as matured crops, such as vegetables, the user may harvest the crops by operating the user end electronic device 1. In practice, the user may open the application program to select, via the input unit 14, a harvesting option (not shown) displayed by the display unit 12 for harvesting the crops corresponding to at least one of the M number of the base structures 71 in the planting areas, making the processing unit 11 transmit a harvesting instruction that relates to the at least one of the M number of the base structures 71 to the control device 5. Then, the control device 5 controls, based on the harvesting instruction, the movable robotic arm device 6 to operate the linking device(s) 75 that corresponds to the at least one of the M number of the base structures 71 to make the cutting components 73 connected to the linking device(s) 75 slide over the corresponding first openings 710. For example, for each farming tool assembly 7 in the corresponding planting area, the movable robotic arm device 6 may drive rotation of the driving member 751, causing movement of the intermediate member 752 relative to the base structure 71, so that the intermediate member 752 brings the sliding member 753 along with the cutting components 73 into horizontal movement, bringing the cutting components 73 to slide over the corresponding first openings 710. Accordingly, parts of the plants that extend out of the first openings 710 would be cut off for harvest (e.g., the stem and leaf parts of the plants would be separated from the root parts).

In order to prevent the cutting components 73 from dust accumulation and endangering people, the farming tools may further include, for one of the base structures 71, a top cover 77 separably mounted on top of the base structure 71 for concealing the cutting components 73. In this case, the top cover 77 is also part of the farming tool assembly 7. The top cover 77 is formed with a plurality of second openings 770 corresponding in position to the first openings 710, respectively, so that the plants in the nursery components 8 can extend outwardly from the second openings 770. It is noted that the top cover 77 has a thickness such that, when the cutting components 73 move/slide between the base structure 71 and the top cover 77 to cut off the parts of the plants that extend out of the first openings 710, the cut-off parts (e.g., stem and leaf parts) will not fall onto the ground for being surrounded by side walls that define the second openings 770, preventing undesired damages to the harvested crops. It is noted that, in this embodiment, the fastening member 750 is fastened to the top cover 77.

In this embodiment, the top cover 77 has a top surface formed with a plurality of grooves 772 that form a grid-like pattern and that are in spatial communication with the second openings 770, so water splashed onto the top cover 77 may flow into the second openings 770 along the grooves 772 to moisturize the plants and/or non-liquid planting medium, e.g., soil. Furthermore, the top surface of the top cover 77 may be coated with an ultraviolet (UV) blocking layer, so as to prevent the top cover 77 from damages caused by long term sun exposure. In this embodiment, the top cover 77 is further formed with a plurality of fourth engaging portions 774 respectively proximate to the second openings 770. Each fourth engaging portion 774 is capable of engaging with the third engaging portion 92 of the functional component 9 when the functional component 9 is placed in one of the second openings 770 proximate to the fourth engaging portion 774 and one of the first openings 710 that corresponds in position to said one of the second openings 770, so that the functional component 9 is secured to the top cover 77. Accordingly, the functional components 9 may be secured to the base structure 71 by engaging with the first engaging portions 711 before the top cover 77 is mounted to the base structure 71, or secured to the top cover 77 by engaging with the fourth engaging portions 774 in case the top cover 77 is mounted to the base structure 71.

In this embodiment, each base structure 71 further includes a plurality of support portions 713 extending downwardly from a periphery of the base structure 71. The support portions 713 may elevate the main body of the base structure to alleviate the pressure exerted on the planting surface by the main body of the base structure 71. In some embodiments, the support portions 713 may be configured as a linking portion to link with an adjacent base structure 71. That is, when multiple base structures 71 are placed side by side, the base structures 71 may be linked/connected together via the support portions 713. In this implementation, the support portions 713 may be provided at four sides of the base structure 71 when the base structure 71 is made to have, for example, a square or rectangular configuration when viewed from above, and may be made into a structure such that adjacent support portions 713 of adjacent base structures 71 can be assembled together. In FIG. 7, the base structure 71 may be formed with at least one assembly hole 715 in a side thereof. The assembly hole 715 is configured to be engaged with a linking component (not shown), so that the base structure 71 can be secured to another base structure 71 using the linking component.

It is noted that each of the sensors 21 may be selectively mounted to a base structure 71, a nursery component 8, a functional component 9 and/or a top cover 77, depending on the target to be sensed.

Moreover, the application program executed on the user end electronic device 1 may be designed to have a payment function where the user is charged according to, for example, the number of the selected planting areas, the selected type(s) of the plant precursors, the selected type(s) of the functional components 9, and the harvesting actions, and the charges are settled by, for example but not limited to, deducting expenses from a deposit account, online credit card/transfer payment, etc.

In summary, the user of the embodiment may operate the user end electronic device 1 to execute the application program to select the preferred planting area(s), to select the preferred types of the plant precursors, and to send the planting information to the remote automated planting sub-system 2, causing the remote automated planting sub-system 2 to automatically plant and grow the selected plant precursors in the selected planting areas. In addition, the remote automated planting sub-system 2 may regularly transmit the growth information to the user end electronic device 1, so that the user may monitor the growth conditions of the plants at any time, and decide whether to add more functional components 9 to acquire more growth information and/or to promote growth of the plants. When the user wants to harvest the plants, the user may operate the user end electronic device 1 to transmit a harvesting instruction to the remote automated planting sub-system 2 for automatically completing the harvesting action, facilitating the user to acquire the crops more easily. The embodiment simplifies the tasks required for growing plants, thereby motivating consumers to participate in organic agriculture.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for remotely growing plants in a planting zone that is divided into a plurality of planting areas, said method comprising:

by a user end electronic device, displaying an image that is related to the planting zone, and that contains a plurality of planting units, each of the planting units corresponding to one of the planting areas;

by the user end electronic device, displaying a plurality of plant precursor options after M number of the planting unit(s) is(are) selected by a user operating the user end electronic device, where M is a positive integer;

by the user end electronic device, transmitting planting information to a remote automated planting sub-system that is disposed in the planting zone and that is communicatively coupled to the user end electronic device after N number of the plant precursor option(s) is(are) selected by the user, where N is a positive integer, the planting information containing the M number of the planting unit(s) and the N number of the plant precursor option(s) that were selected by the user; and upon receipt of the planting information, by the remote automated planting sub-system, acquiring plant precursors of N type(s) that correspond(s) to the N number of the plant precursor option(s), and planting the plant precursors thus acquired in M number of the planting areas that correspond(s) to the M number of the planting unit(s);

wherein the remote automated planting sub-system includes a control device communicatively coupled to the user-end electronic device, a movable robotic arm device coupled to and controlled by the control device, and a plurality of farming tools, the farming tools including a plurality of base structures, and a plurality of nursery components;

wherein each of the base structures is formed with a plurality of first openings, and a plurality of first engaging portions respectively proximate to the first openings;

wherein each of the nursery components is indented to form a recess for accommodating a plant precursor, and is formed with a second engaging portion on the top of the nursery component;

wherein, when one of the nursery components is placed into one of the first openings of one of the base structures, the second engaging portion of said one of the nursery components is to engage with one of the first engaging portions that is proximate to said one of the first openings, so that said one of the nursery components is secured to said one of the base structures;

wherein the planting the plant precursors thus acquired in M number of the planting area(s) includes:

by the control device and based on the planting information, controlling the movable robotic arm device to secure those of the nursery components that accommodate plant precursors of the N type(s) to M number of the base structures, so as to form M number of farming tool assembly(ies);

by the control device and based on the planting information, controlling the movable robotic arm device to place the M number of farming tool assembly(ies) onto the M number of the planting areas, such that the nursery components of the M number of farming tool assembly(ies) extend through surface of planting medium in the M number of the planting areas.

2. The method of claim 1, wherein the remote automated planting sub-system includes a sensor unit and an image capturing device that cooperatively detect environment conditions of the planting areas;

said method further comprising:

by the remote automated planting sub-system, regularly collecting sensing results via the sensor unit, and regularly obtaining images via the image capturing device;

by the remote automated planting sub-system, generating and transmitting, to the user end electronic device based on the regularly collected sensing results and the regularly obtained images, plant growth information that relates to growth of the plant precursors planted in the in M number of the planting areas; and by the user end electronic device, generating and displaying a simulation image that simulates growth conditions of the plant precursors planted in the M number of the planting areas based on the plant growth information.

3. The method of claim 2, further comprising:

by the user end electronic device, when the simulation image is selected by the user, displaying details of the plant growth information that contain images of the plant precursors planted in the M number of the planting areas, and variation in at least one of temperature, humidity, insolation or pH level of planting medium of the M number of the planting areas.

4. The method of claim 1, wherein the farming tools further include, for each of the base structures:

a plurality of cutting components disposed on top of the base structure and respectively proximate to the first openings; and a linking device connected to the cutting components;

said method further comprising:

by the control device, controlling, upon receipt of a harvesting instruction that relates to at least one of the M number of the base structures from the user end electronic device, the movable robotic arm device to operate the linking device(s) that corresponds to the at least one of the M number of the base structures to make the cutting components connected to the linking device(s) slide over the corresponding first openings.

5. The method of claim 1, wherein the farming tools further include multiple types of functional components each being formed with a third engaging portion on the top of the functional component;

wherein, when one of the functional components is placed into one of the first openings of one of the base structures, the third engaging portion of the functional component is to engage with one of the first engaging portions that is proximate to said one of the first openings, so that the functional component is secured to said one of the base structures;

said method further comprising, after the planting the plant precursors thus acquired in M number of the planting area(s):

by the user end electronic device, displaying a function menu containing a plurality of function options corresponding to the types of the functional components;

by the user end electronic device, transmitting a function enabling instruction to the control device, the function enabling instruction containing at least one of the function options selected by the user; and by the control device and based on the function enabling instruction, controlling the movable robotic arm device to acquire at least one of the functional components of a type that corresponds to the at least one of the function options, and securing the at least one of the functional components to at least one of the M number of the base structures that are placed on the M number of the planting areas.

6. A system for remotely growing plants in a planting zone that is divided into a plurality of planting areas, comprising a user end electronic device, and a remote automated planting sub-system disposed in the planting zone and communicatively coupled to said user end electronic device, wherein said user end electronic device is configured to display an image that is related to the planting zone, and that contains a plurality of planting units, each of the planting units corresponding to one of the planting areas;

wherein said user end electronic device is configured to display a plurality of plant precursor options after M number of the planting unit(s) is(are) selected by a user operating the user end electronic device, where M is a positive integer;

wherein said user end electronic device is configured to transmit planting information to said remote automated planting sub-system after N number of the plant precursor option(s) is(are) selected by the user, where N is a positive integer, the planting information containing the M number of the planting unit(s) and the N number of the plant precursor option(s) that were selected by the user;

wherein said remote automated planting sub-system is configured to, upon receipt of the planting information, acquire plant precursors of N type(s) that correspond(s) to the N number of the plant precursor option(s), and to plant the plant precursors thus acquired in M number of the planting areas that correspond(s) to the M number of the planting unit(s);

wherein said remote automated planting sub-system includes a control device communicatively coupled to said user-end electronic device, a movable robotic arm device coupled to and controlled by said control device, and a plurality of farming tools, said farming tools including a plurality of base structures, and a plurality of nursery components;

wherein each of said base structures is formed with a plurality of first openings, and a plurality of first engaging portions respectively proximate to said first openings;

wherein each of said nursery components is indented to form a recess for accommodating a plant precursor, and is formed with a second engaging portion on the top of said nursery component;

wherein, when one of said nursery components is placed into one of said first openings of one of said base structures, said second engaging portion of said one of said nursery components is to engage with one of said first engaging portions that is proximate to said one of said first openings, so that said one of said nursery components is secured to said one of said base structures;

wherein said remote automated planting sub-system is configured to plant the plant precursors thus acquired in M number of the planting area(s) by:

using the control device and based on the planting information to control the movable robotic arm device to secure those of the nursery components that accommodate plant precursors of the N type(s) to M number of the base structures, so as to form M number of farming tool assembly(ies); and using the control device and based on the planting information to control the movable robotic arm device to place the M number of farming tool assembly(ies) onto the M number of the planting areas, such that the nursery components of the M number of farming tool assembly(ies) extend through surface of planting medium in the M number of the planting areas.

7. The system of claim 6, wherein said farming tools further include, for each of said base structures:

a plurality of cutting components disposed on top of said base structure and respectively proximate to said first openings; and a linking device connected to said cutting components;

wherein said control device is configured to control, upon receipt of a harvesting instruction that relates to at least one of the M number of the base structures from the user end electronic device, said movable robotic arm device to operate said linking device(s) that corresponds to the at least one of the M number of said base structures to make said cutting components connected to said linking device(s) slide over the corresponding first openings.

8. The system of claim 7, wherein said linking device includes:

a fastening member having a fastened first end portion, and a second end portion away from said first end portion thereof;

a driving member having a first end portion pivotally connected to said second end portion of said fastening member, and a second end portion away from said first end portion thereof;

an intermediate member having a first end portion pivotally connected to said second end portion of said driving member, and a second end portion away from said first end portion thereof; and a sliding member connected to said second end portion of said intermediate member, connected to said cutting components, disposed on top of said base structure, and slidable in a sliding direction parallel to a top surface of said base structure, such that, when said driving member is operated to move said intermediate member relative to said base structure, said intermediate member moved by said driving member causes said sliding member to slide in the sliding direction, bringing said cutting components to slide over said first openings.

9. The system of claim 8, wherein said farming tools further include a top cover separably mounted on one of said base structures, and formed with a plurality of second openings corresponding in position to said first openings of said one of said base structures, respectively.

10. The system of claim 9, wherein said farming tools further include at least one functional component separably mounted to one of said base structures, and formed with a third engaging portion on the top thereof; and wherein, when said at least one functional component is placed into one of said first openings of one of said base structures, said third engaging portion is to engage with one of said first engaging portions that is proximate to said one of the first openings, so that said functional component is secured to said one of said base structures.

11. The system of claim 10, wherein said top cover is formed with a plurality of fourth engaging portions respectively proximate to said second openings;

wherein said third engaging portion is to engage with one of said fourth engaging portions that is proximate to one of said second openings, so that said functional component is secured to said top cover.

12. The system of claim 10, wherein said farming tools further include at least one sensor that communicates with a computer, that is mounted to one of said base structures, said nursery components, said at least one functional component and said top cover, and that is configured to sense an environment condition, and to transmit a sensing result to the computer.

13. A computer program product comprising a computer-readable storage medium which is non-transitory and tangible, said computer-readable storage medium storing an application program which, when loaded and executed by a computer device, causes the computer device to communicate with a remote automated planting sub-system that is disposed in a planting zone to perform the method of claim 1.

14. A farming tool assembly, comprising:

a base structure formed with a plurality of first openings, and formed with a plurality of first engaging portions respectively proximate to said first openings;

a plurality of nursery components, each of which is removably mounted to said base structure, and is formed with a second engaging portion on the top of said nursery component, wherein, when one of said nursery components is placed into one of said first openings of said base structure, said second engaging portion is to engage with said first engaging portion that is proximate to said one of said first openings, so that said one of said nursery components is secured to said base structure;

a plurality of cutting components disposed on top of said base structure and respectively proximate to said first openings; and a linking device connected to said cutting components, and operable to make said cutting components slide over said first openings.

15. The farming tool assembly of claim 14, wherein said linking device includes:

a fastening member having a fastened first end portion, and a second end portion away from said first end portion thereof;

a driving member having a first end portion pivotally connected to said second end portion of said fastening member, and a second end portion away from said first end portion thereof;

an intermediate member having a first end portion pivotally connected to said second end portion of said driving member, and a second end portion away from said first end portion thereof; and a sliding member connected to said second end portion of said intermediate member, connected to said cutting components, disposed on top of said base structure, and slidable in a sliding direction parallel to a top surface of said base structure, such that, when said driving member is operated to move said intermediate member relative to said base structure, said intermediate member moved by said driving member causes said sliding member to slide in the sliding direction, bringing said cutting components to slide over said first openings.

16. The farming tool assembly of claim 15, further comprising a top cover separably mounted on said base structure, and formed with a plurality of second openings corresponding in position to said first openings, respectively.

17. The farming tool assembly of claim 16, further comprising at least one functional component separably mounted to said base structure, and formed with a third engaging portion on the top thereof;
  wherein, when said at least one functional component is placed into one of said first openings, said third engaging portion is to engage with one of said first engaging portions that is proximate to said one of the first openings, so that said functional component is secured to said base structure.

18. The farming tool assembly of claim 16, further comprising at least one functional component separably mounted to said top cover, and formed with a third engaging portion on the top thereof;
  wherein said top cover is formed with a plurality of fourth engaging portions respectively proximate to said second openings;
  wherein said third engaging portion is to engage with one of said fourth engaging portions that is proximate to one of said second openings corresponding in position to said one of the first openings, so that said functional component is secured to said top cover.

19. The farming tool assembly of claim 17, further comprising at least one sensor that communicates with a computer, that is mounted to one of said base structure, said nursery components, said at least one functional component and said top cover, and that is configured to sense an environment condition, and to transmit a sensing result to the computer.

* * * * *